Patented Apr. 1, 1941

2,236,847

UNITED STATES PATENT OFFICE 2,236,847

COATED PAPER

Frederick H. Frost, Portland, Maine, assignor to S. D. Warren Company, Boston, Mass., a corporation of Massachusetts No Drawing. Application May 23, 1938, Serial No. 209,629

2 Claims. (Cl. 91—68)

In the practice of paper-making it is customary to apply mineral coating compositions to webs of suitable paper stock. Such coatings comprise pigment and adhesive and are ordinarily applied as aqueous dispersions which are dried on the paper by evaporation of the water. The adhesives in most common use are casein, modified starch, and animal glue, while vegetable proteins and water-dispersible synthetic resins are used to a limited extent. In customary white coatings the pigment is usually china clay, calcium carbonate, magnesium pigment, and/or blanc fixe. Satin white or a small quantity of titanium pigment or zinc pigment also commonly is included in the coating composition. Generally speaking, in mineral-coated paper the proportion of high intensity pigment, e. g. titanium dioxide, is only a few per cent of the total solids content of the coating, rarely over 5 per cent, and never to the best of my knowledge over 15%.

When I speak of mineral-coated paper it will be understood that I do not include under this term paper having a mere surface wash of pigment or paper which has been merely printed with pigmented aqueous ink. What I am concerned with is true coated paper having coating on one side amounting to at least 5 pounds and usually 8 to 10 pounds or more to a ream of 500 sheets cut 25 x 38 inches. In other words the paper should have on its surface a sufficient thickness of coating so that when it is supercalendered or otherwise glazed according to customary practice it will present a surface as level and smooth as is demanded in paper suitable for the reproduction of fine half-tone cuts.

Paper coated as just described with suitable compositions comprising the common pigments previously mentioned provides a surface having excellent whiteness, brightness, and opacity, which when properly calendered is eminently suitable for reception of high quality printing. Likewise such coated papers, especially when heavily calendered, provide a base fairly satisfactory for subsequent lacquering. If the coating is made with a lower than normal proportion of adhesive according to my Patent No. 2,083,441 the paper will be exceptionally level and very suitable for lacquering insofar as gloss, smoothness, and evenness of absorption are concerned. Such prior-art mineral-coated papers have in many cases proved to be entirely satisfactory bases for metallic, pigmented, or other opaque or colored lacquers.

It has been found, however, that the usual white mineral-coated papers, howsoever bright and white they may be before being lacquered, showed a distinct decrease in whiteness after being coated with a colorless, transparent lacquer. Such lacquered paper has possessed an appearance of dinginess generally acknowledged to be undesirable but hitherto considered unavoidable.

It is an object of the present invention to provide a white mineral-coated, calendered base-stock having a surface suitable for being lacquered but in which the tendency to become badly darkened or dingy when coated with a substantially colorless, transparent lacquer is minimized or substantially eliminated.

A second object is to provide a method of making such a base-stock.

Another object is the manufacture of lacquered paper of high gloss, brightness and whiteness.

Other objects and advantages will appear hereinafter.

In the past when extreme whiteness has been required in lacquered paper it has been obtained by the use of a lacquer containing white pigment rather than a transparent lacquer. Pigmented lacquers contain pigments having high indices of refraction, for, as is well known, a pigment of low refractive index has little hiding power when used in a non-aqueous paint or lacquer. While the use of a white pigmented lacquer results in a very white surface of porcelain-like brightness such as hitherto has not been obtainable by other means in lacquered paper, nevertheless pigmented lacquer is in some ways less desirable to use than is clear, unpigmented lacquer. In the first place, clear lacquer is preferred from consideration of cost, for pigmented lacquer must be carefully compounded and ground before use and must be applied in a heavier layer than will suffice for clear lacquer. Then again, a coating of pigmented lacquer is more liable to flaws from lumps or streaks while being applied, and it shows such flaws more conspicuously than does a clear lacquer coating. Moreover, pigmented lacquer fails to give the desired appearance of depth that is given by clear lacquer. Pigmented lacquer obviously can not be used over a printed surface when it is desired that the printing shall not be obscured. Finally pigment in lacquer materially lowers the resistance of the film to penetration by water-vapor, so that pigmented lacquers can not be used on sheet material that is desired to be "moisture-proof".

I have discovered that I can make a white mineral-coated paper which has the gloss and levelness of surface required in a base-stock for lacquering, which at the same time exhibits little or substantially no decrease in whiteness when it is coated with a colorless, transparent lacquer, and which has practically the same whiteness as paper coated with a high-grade, white, pigmented lacquer. To achieve such results I use, in compounding the mineral coating composition, white pigments of the same nature as those used in white lacquers, i. e., pigments with high indices of refraction. The aqueous coating mixture containing the high intensity pigment and suitable adhesive is applied to paper and the paper is dried, calendered, and lacquered with substantially colorless, transparent lacquer. The lacquer penetrates into the coating to a degree depending upon the proportion of adhesive in the coating and surrounds the pigment particles as hitherto, but the apparent whiteness of the coating is not appreciably reduced because of the considerable difference in the refracting properties of the pigment and of the film-forming constituents of the lacquer. Enough clear lacquer is applied, of course, so that a continuous, glossy film is left upon the surface of the paper over and above the quantity that actually penetrates into the mineral-coating. When the lacquer has dried, the composite layer of pigment and lacquer is very similar to the film left when a pigmented lacquer dries, except that in the former case the uppermost layer of lacquer is still transparent and without pigment. Indeed the effect is approximately the same as if a pigmented lacquer had been applied first and had then been followed by coating of clear lacquer, but this effect has been accomplished by only one application of lacquer and without the undesirabilities attendant upon the use of a pigmented lacquer.

The pigments which I use to ensure whiteness in my lacquered paper and which I refer to in this specification variously as pigments of high indices of refraction and as high intensity pigments, are those white pigments which have indices of refraction relative to air of 2 or over. Examples of such pigments are antimony oxide, titanium dioxide, zinc oxide, and zinc sulfide.

In carrying out the invention it is not necessary that all the pigment in the mineral-coating be pigment having a high index of refraction. Indeed, it is preferred that in addition to the high intensity pigment the coating also shall contain some pigment having good finishing properties, such as fine coating clay or satin-white because as has been previously pointed out, it is advantageous, in obtaining a lacquered product of the finest possible appearance, that the mineral-coated paper before being lacquered shall be capable of being calendered to a very level surface with a high finish. Therefore it is well to have at least 10 per cent of the pigment in the coating consist of high finishing pigment. Generally speaking it is preferred that considerably more than 10 per cent of the mixture shall be pigment of the class commonly used in mineral coatings and known to impart desirable qualities to such coatings.

Nevertheless, in practicing the invention it is absolutely essential that a substantial proportion of the coating be pigment having a high refractive index. I prefer to have at least 40 per cent of the pigment in the mineral-coating consist of high intensity pigment. Less complete satisfaction, but still a very substantial improvement over ordinary mineral-coated papers, is given by mineral coatings containing as little as 20 per cent of titanium dioxide. Naturally the quantity of high intensity pigment required for satisfaction in any coating depends somewhat upon the particular high intensity pigment used, as well as upon the other pigments with which it may be mixed. Generally speaking, however, I have found most white coatings to be reasonably satisfactory if the average refractive index of the pigment mixture is about 2. Useful mixtures of titanium dioxide and clay include the range of from 30 to 70 per cent of titanium dioxide with a range of from 70 to 30 per cent of clay.

To be satisfactory for lacquering the mineral-coated paper, in addition to being satisfactorily and permanently white, must possess a level surface. This necessitates supercalendering or an equivalent process. Levelness and general satisfactoriness in appearance are improved by making the mineral-coating slack-sized as disclosed in my Patent 2,083,441 previously mentioned. The slack-sized mineral-coating of that disclosure contains less adhesive than is used in coatings used on printing papers. Consequently if such slack-sized coated paper is calendered and then printed on a printing press with a standard type of ink such as is commonly used for printing glossy coated paper the printing plate "picks" coating from the surface of the paper. Such coating likewise shows picks when tested in the usual manner with Dennison's paper-testing wax No. 4. The low adhesive content of the coating, while yielding a product unsuitable for printing, makes the surface particularly susceptible to the effects of super-calendering, so that an extremely level, evenly absorptive surface may be obtained by properly calendering the coated paper.

The use of high intensity white pigments according to the present invention is particularly effective in the case of slack-sized coatings, for such coatings are more penetrable by lacquer than are coatings containing larger quantities of adhesive. Indeed it is well known that one way to decrease penetration of varnish or lacquer into a mineral-coating is to increase materially the proportion of adhesive in the coating. At the same time, of course, levelness and finish of the surface are adversely affected. Nevertheless, in spite of its deleterious effect upon finish, a high adhesive content has in the past sometimes been used to make coatings hold up lacquer. The increased adhesive content, however, has in itself tended considerably to decrease the whiteness of the coating so that while such increased adhesive undoubtedly does decrease lacquer penetration, it still fails to yield the bright, white final product desired. The present invention, however, makes possible the retention of a clean, bright whiteness in the lacquered paper whatever the adhesive content of the mineral coating may be. When the coating is "hard-sized," i. e., contains a relatively large proportion of adhesive the high intensity pigment is particularly effective when used in quantities coming within the lower portion of the range previously mentioned.

Specific coating mixtures that exemplify the invention follow:

*Example 1*

| | Parts |
|---|---|
| Antimony oxide | 90 |
| Satin white | 10 |
| Modified starch | 18 |
| Water | 170 |

Example 2

| | |
|---|---|
| Titanium dioxide | 40 |
| Fine coating clay | 60 |
| Casein | 9 |
| Water | 130 |

Example 3

| | |
|---|---|
| Zinc sulfide | 60 |
| Fine coating clay | 30 |
| Satin white | 10 |
| Casein | 11 |
| Water | 145 |

Example 4

| | |
|---|---|
| Titanium dioxide | 20 |
| Clay | 60 |
| Calcium carbonate | 20 |
| Casein | 25 |
| Water | 150 |

By the practice of the invention mineral-coated paper of satisfactorily level and/or glossy surface is produced, which when coated with colorless, transparent lacquer retains its original whiteness substantially undiminished, and which yields a lacquered product that is eminently satisfactory in respect to whiteness, brightness, brilliance, depth, and gloss.

By the term lacquer as used in the specification and claims I have meant a dispersion in volatile organic solvents of cellulose compounds and/or colorless resins, either natural or synthetic together with plasticizing or softening agents if desired.

I claim:

1. Process which comprises applying to a paper web, in an amount at least equivalent to 5 pounds dry weight per ream on one side, a mineral coating composition consisting essentially of aqueous dispersion of adhesive and a mixture of white pigments of which from 30 to 70% is titanium dioxide and from 70 to 30% is a high finishing pigment of the group consisting of satin white, calcium carbonate and fine coating clay, the pigment mixture having an average refractive index of at least about 2, drying the coated paper, smoothing and leveling the coated surface of the paper to a high finish by a super-calendering operation, and applying on the coated surface a layer of substantially colorless and transparent lacquer.

2. A paper product produced by the process of claim 1 and characterized in that the lacquered product has substantially the same brightness as the coated and supercalendered but unlacquered base.

FREDERICK H. FROST.